June 11, 1968     A. DE LA LASTRA     3,388,311
POWER CONVERTER FOR CONVERTING AN UNREGULATED DC INPUT
VOLTAGE INTO A REGULATED OUTPUT VOLTAGE
Filed May 27, 1966

INVENTOR.
ALBERT de la LASTRA

BY Ostrolenk, Faber, Gerb & Soffen

ATTORNEYS

United States Patent Office 3,388,311
Patented June 11, 1968

3,388,311
POWER CONVERTER FOR CONVERTING AN UNREGULATED DC INPUT VOLTAGE INTO A REGULATED OUTPUT VOLTAGE
Albert de la Lastra, Bethpage, N.Y., assignor to SBD Systems, Inc., Farmingdale, N.Y., a corporation of New York
Filed May 27, 1966, Ser. No. 553,484
16 Claims. (Cl. 321—16)

This invention relates to a power converter, and more particularly relates to a power conversion system for converting an unregulated DC input voltage into a regulated output voltage.

The prior art has suggested various systems for converting unregulated DC input voltages to regulated AC and/or DC output voltages. One such prior art system may be conveniently classified as dissipative in nature in that it requires a transistor in series with the input side of the primary of a transformer, the secondary of which represents the output of the system. Although the output of such a circuit is regulated, the interposed series transistor becomes the source of considerable power loss, and can inefficiently become an appreciable part of the total power dissipated at high voltages.

A second type of system prevalent in the prior art may be classified as non-dissipative in nature, in that it does not require a power consuming transistor in series with the input side of the primary of the transformer. However, such non-dissipative systems suffer from a serious disadvantage in that the peak value of the output voltage varies directly with input voltage. High peak values of the input voltage place stringent requirements on the transformer (requiring large dimensions) and also on rectifying and filtering networks which might be utilized to convert the output voltage into the desirable DC form.

In contradistinction to the prior art systems noted above, the instant invention provides a power converter which does not require a power consuming transistor in series with the input side of the primary of the cooperating transformer, and furthermore provides means by which the voltage which appears across the primary of such transformer can be limited to a predetermined amount. Thus it becomes apparent that the power converter of the instant invention is non-dissipative in nature, and furthermore because of the feature of limiting the voltage which may appear across the primary of the cooperating transformer, can be made relatively smaller than was possible in the prior art.

In its preferred embodiment the instant invention includes a transformer having a primary and secondary inductively coupled thereto. Voltage limiting means cooperate with the transformer and limit the magnitude of input voltage which may appear across the primary of the transformer, and as noted previously, permits the utilization of relatively smaller transformers. To permit the transformer to operate in its voltage limited capacity, energy storage means, preferably in the form of an inductor, is connected to the transformer to accumulate input voltage which is in excess of the predetermined amount which is set by the voltage limiting means. Finally there is provided return circuit means by which the energy storage means is permitted to discharge the accumulated excess input voltage across the primary such that the voltage appearing across the secondary of the transformer is necessarily a regulated waveform.

The invention further includes two normally non-conducting alternate circuit paths connected to the primary of the transformer with such circuit paths being sequentially switched on and off at predetermined time intervals to cause the current generated by the input voltage to alternately flow in opposite directions through the primary of the transformer. Furthermore, the aforementioned return circuit means actually comprises two distinct normally non-conducting circuits which are alternately switched to their conducting state in a time sequence which is intermittent with respect to the predetermined time interval at which the alternate circuit paths are switched on and off. The sequence of events is as follows.

Initially, the first circuit path is established, whereby the input voltage flows in a first direction through the primary of the transformer, with the voltage limiting means limiting the magnitude of input voltage which may appear across such primary. As the first circuit path is turned off, but before the second circuit path is switched on, the first return circuit is switched on whereby energy accumulated by the inductor which is in excess of the predetermined amount determined by the voltage limiting means, is permitted to be discharged through the primary of the transformer, again limited by the voltage limiting means.

Next the second circuit path is established such that the input voltage flows in the opposite direction through the primary of the transformer while simultaneously the first return circuit is switched off. The magnitude of voltage appearing across the primary is again limited by the voltage limiting means. Finally, the second circuit path is switched off and the second return path is switched on to permit the energy storage means, i.e., the inductor, to discharge the excess input energy through the primary of the transformer.

The output appearing across the secondary of the transformer is a square wave of constant amplitude and may be full-wave rectified to produce the desired DC output.

In one embodiment of the instant invention, the alternately energized circuit paths each include a transistor alternately switched off and on at the predetermined time intervals by the application of a driving signal thereto, while the return circuits, which permit the discharge of the energy storage means, each include a silicon controlled rectifier fired subsequent to the turning off of the transistor of one circuit path, but prior to the turning on of the transistor in the second circuit path. Alternatively the return circuits might include transistors instead of SCR's.

In an alternative embodiment of the instant invention the two circuit paths which permit the input voltage to flow in opposite directions through the primary of the transformer each include a pair of transistors which are both energized when that particular circuit path is being utilized to permit the flow of input current. Subsequently, one of the transistors of one circuit path is de-energized and the remaining energized transistor cooperates with a diode network to permit the discharge of the energy storage device, i.e., the inductor, much in the same manner as explained with respect to the previous embodiment. Finally, both transistors of the first circuit path are de-energized and the second pair of transistors of the second circuit path are energized to permit the input current to flow in the opposite direction through the transformer. Subsequently, but prior to the time that both transistors of the second circuit path are turned off, one of them is turned off such that the remaining energized transistor cooperates with the diode network to permit a discharge of the energy storage means across the primary of the transformer. As will be further explained in detail, the output waveform is a regulated voltage but is displaced by a quarter cycle relative to the output of the first embodiment.

Accordingly, it is an object of the instant invention to provide a power conversion system which overcomes serious disadvantages prevalent in the prior art.

Another object of the instant invention is to provide such a power conversion system which is non-dissipative in nature in that it eliminates the necessity of a power consuming series interposed transistor.

Still another object of the instant invention is to provide such a power conversion system which utilizes voltage limiting means to limit the voltage which may appear across the primary of the transformer utilized therein in such a manner as to permit the use of relatively smaller transformers.

Yet another object of the instant invention is to provide such a power conversion system which utilizes an energy storage element and cooperating return circuits to permit the energy storage device to discharge the excess accumulated input voltage across the primary of the cooperating transformer.

Still another object of the instant invention is to provide such a power conversion system which utilizes normally non-conducting circuit paths energized at predetermined intervals to permit the passage of input current in opposite directions through the primary of the cooperating transformer.

Another object of the instant invention is to provide such a power conversion system which utilizes alternate, normally non-conducting return circuits which are sequentially energized at times intermediate such predetermined time intervals to permit the discharge of the energy storage means across the primary of the cooperating transformer.

Other objects and a fuller understanding of the instant invention may be had by referring to the following detailed description and drawings, in which.

Figure 1:
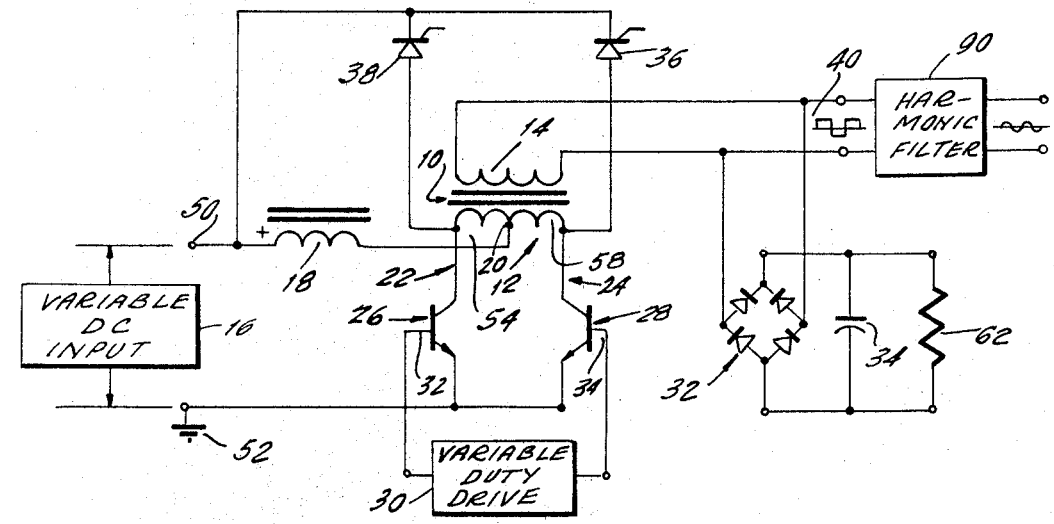
FIGURE 1 is a schematic diagram of one embodiment of the instant invention.

Referring to FIGURE 1, there is shown a preferred embodiment of the instant invention which includes a transformer 10 including a primary portion 12 and secondary portion 14 inductively coupled thereto. The variable DC input 16 which is to be regulated by the instant invention is applied through an inductor 18 to the center tap 20 of the primary 12 and is alternately returned to circuit ground through normally non-conducting circuit paths 22 and 24 which include the normally non-conducting transistors 26 and 28, respectively. Transistors 26 and 28 are alternately driven to their conducting state at predetermined time intervals by the application of a variable duty driving signal 30 to the bases 32 and 34 of transistors 26 and 28.

Connected across the secondary 14 is a full wave bridge rectifier 32 and a voltage limiting device, shown in the form of a capacitor 34, which is reflected into the primary 12 of the transformer 10 thereby limiting the voltage that may appear across the primary of transformer 10.

Inductor 18 acts as an energy storage device in that it accumulates input voltage which is in excess of the predetermined amount set by voltage limiting means 34.

Normally non-conducting circuit elements such as the silicon controlled rectifiers 36 and 38 are alternately gated on by suitable driving means to permit the inductor 18 to discharge its accumulated input voltage across the primary 12 of the transformer 10 after the respective transistor 26 or 28 has been turned off.

The operation of the circuit of FIGURE 1 may be most clearly understood by analyzing a complete cycle of operation as comprising four distinct sub-cycles. The voltages appearing at terminal 40 during the four sub-cycles are shown in FIGURE 2 and are appropriately identified 42, 44, 46 and 48.

Figure 2:
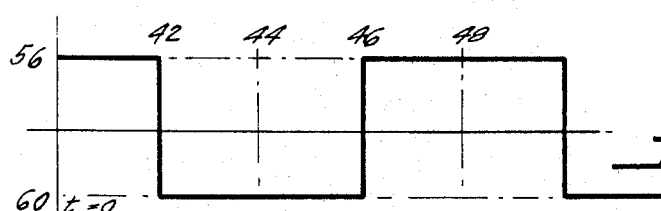
FIGURE 2 is a representation of the voltage waveform which would appear across one output of the circuit of FIGURE 1.

During the first quarter cycle of operation, beginning at $t=0$ in FIGURE 2, the variable DC input 16 is applied to input terminal 50 and the transistor 26 is made conducting by application of the variable duty drive signal 30 to the base 32. A current path is established from terminal 50, through inductor 18, through the left-hand portion 54 of the primary 12, through transistor 26, and back to ground terminal 52. It will be appreciated that during such current flow, the magnitude of voltage which may appear across the left-hand portion 54 of primary 12 will be limited by the capacitor 34 which is reflected into the primary 12.

The remainder of the input voltage which is in excess of the predetermined amount set by the capacitor 34 is accumulated on inductor 18 (as a back EMF). Thus during the first quarter cycle of operation the output waveform appearing at terminal 40 and appearing between $t=0$ and 42 in FIGURE 2 is a voltage of regulated amplitude 56.

During the second quarter cycle of operation, transistor 26 is turned off, but the normally non-energized circuit element 36, such as a silicon controlled rectifier, is pulsed on by the application of a suitable drive to complete a return circuit path from inductor 18, through the right-hand portion 58 of primary 12, through element 36, and back to the inductor 18 to permit the discharge of the excess input voltage accumulated on inductor 18 across the right-hand portion 58 of primary 12. Again the magnitude of voltage which may appear across the right-hand portion 59 is limited by the voltage limiting means, i.e., capacitor 34.

Thus, in the second quarter cycle of operation, current flowing across primary 12 is in the opposite direction and hence is shown to be of negative amplitude 60 existing between the time periods 42 and 44 in FIGURE 2. Obviously the coupling between primary 12 and secondary 14 could be reversed to provide a negative pulse during the first quarter of operation and a positive pulse during the second quarter. Furthermore, a regulated DC output may be obtained by applying the output at terminal 40 to the full-wave bridge rectifier 32 such that a regulated DC output would appear across the load resistance 62.

During the third quarter cycle of operation transistor 28 is turned on by the application of a variable duty drive 30 to the base 34 thereof, thus completing a path from DC input 16, through terminal 50, inductor 18, the right-hand portion 58 of primary 12, transistor 28, and ground 52, with the voltage appearing across the primary 12 again being limited by the voltage limiting means 34 and with the excess input voltage above the magnitude determined by capacitor 34 being stored by inductor 18 in the same manner as previously explained. As transistor 28 begins to draw current it will provide reverse bias on element 36 causing it to turn off. Since current flow is through the right-hand portion 58 of primary 12, the voltage output appearing at 40 in FIGURE 1 and occurring during the period between 44 and 46 in FIGURE 2 is shown as the negative amplitude 60.

During the fourth and final sub-cycle, transistor 28 is turned off, and circuit element such as the SCR 38 is gated on to complete the return circuit path from inductor 18, through the left-hand portion 54 of primary 12, through the now conducting circuit element 38, and back to the inductor 18, thereby permitting the excess voltage accumulated on inductor 18 to discharge through the left-hand portion 54 of primary 12, it again being understood that the voltage limiting means 34 limits the magnitude of voltage which may appear across the primary 12. Since the current flow is across the left-hand portion 54 of primary 12, the output appearing at terminal 40 or within the time period 46–48 in FIGURE 2 is shown as being of positive amplitude 56.

Thus a complete cycle of operation is completed and a regulated square wave may be taken off terminal 40, or in the alternative a regulated DC output may be taken off load resistance 62. If desired, the harmonic filter 90 may be added to output 40.

When transistor 26 is turned on again to initiate the next cycle of operation the current flow through left-hand portion 54 of primary 12 will provide reverse bias for the element 38 thereby turning it off such that the complete cycle may be repeated.

As alternative embodiments of the circuit shown in FIGURE 1, it will be appreciated that transistors or equivalent circuit elements may be utilized in place of the silicon controlled rectifiers 36 and 38. In the event that transistors are utilized in such capacity, the circuit polarities would require a diode in series with each of such transistors.

Figure 3:
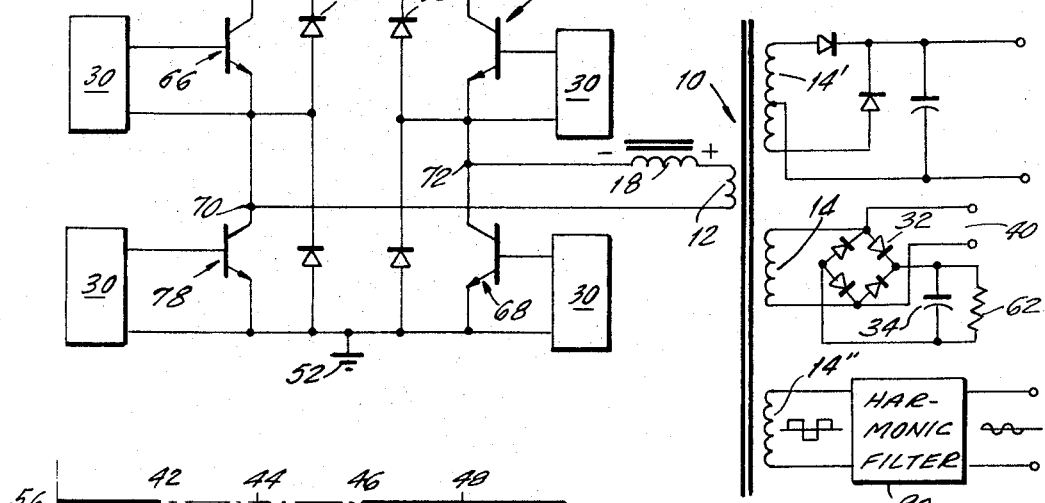
FIGURE 3 is a schematic diagram of a second embodiment of the instant invention.

Turning to FIGURE 3, there is shown an alternative embodiment of the instant invention wherein like numbers have been used to designate like components. Transformer 10 includes primary 12 and various secondaries 14, 14' and 14". The full-wave bridge rectifier 32 and the voltage limiting means in the form of capacitor 34 are connected through the bridge 32 and secondary 14 across the primary 12.

Figure 4:
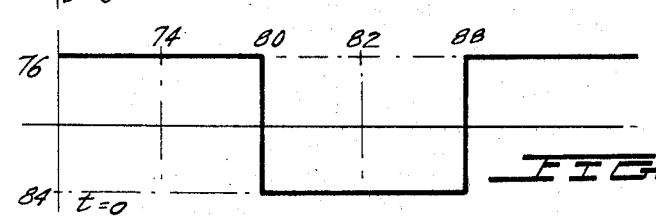
FIGURE 4 is the representation of a voltage waveform which would appear at one of the outputs of the circuit of FIGURE 3.

The input side of the circuit includes the variable DC input 16, the energy storage device, in the form of inductor 18, and a transistor and diode network generally illustrated at 64 which performs the functions previously performed by transistors 26, 28 and control elements 36 and 38 of FIGURE 1. As was the case with the circuit of FIGURE 1, it is helpful to analyze the circuit of FIGURE 3 in four distinct sub-cycles, the waveforms for which are illustrated in FIGURE 4.

During the first quarter cycle of operation, transistors 66 and 68 are turned on by the application of suitable driving signals 30 to the bases thereof. The circuit path is then complete from the variable DC input source 16 to terminal 50, transistor 66, junction 70, transformer primary 12, inductor 18, junction 72, transistor 68 and to ground 52. It will be appreciated that the voltage permitted across primary 12 will again be limited by voltage limiting means 34 reflected into the primary 12. The AC output at terminal 40 for this quarter cycle would appear between time $t=0$ and the designation 74 in FIGURE 4 as regulated amplitude 76.

During the second quarter cycle of operation, transistor 68 is turned off, but transistor 66 remains in its conducting state. A return circuit is now complete from inductor 18, junction 72, diode 78, transistor 66, junction 70, transformer primary 12 and back to inductor 18 whereby the input voltage accumulated in inductor 18 in excess of the amount set by voltage limiting means 34, may now be discharged across primary 12. Since the discharge current flowing during the second quarter cycle of operation is in the same direction as the original current flow generated by input voltage 16, the output at terminal 40 is of positive amplitude, again at an amplitude 76 determined by the capacitor 34.

During the third quarter cycle of operation, transistors 66 and 68 are both off while transistors 78 and 80 are turned on by the application of the drive signal 30 to the respective bases thereof. A circuit path is thus completed from source 16 through transistor 80, junction 72, inductor 18, primary 12, junction 70, transistor 78 to ground 52. The magnitude of voltage which may appear across primary 12 is again limited by capacitor 34, but the current flow is in the opposite direction such that the output at terminal 40 during the third quarter cycle (between 80 and 82 in FIGURE 4) is of negative amplitude 84 which is again dependent upon the value of capacitor 34.

During the fourth and final quarter cycle, transistor 80 remains conducting, but transistor 78 is turned off. Thus, a return circuit discharge path is completed from inductor 18 through primary 12, junction 70, diode 86, transistor 80, junction 72 and back to inductor 18, whereby the excess input voltage energy stored on inductor 18 may be discharged across primary 12. Since the current flow during the fourth quarter cycle is in the same direction as during the third quarter cycle the voltage waveform between 82 and 88 in FIGURE 4 is of negative amplitude 84. The complete cycle is reinitiated by turning off transistor 80 and turning on transistors 66 and 68.

As in the case of the embodiment of FIGURE 1, the inductive coupling between primary and secondary 12 and 14 could be reversed to provide negative amplitude during the first half cycle and positive amplitude during the second half cycle of operation. Furthermore, it can be seen that the waveform of FIGURE 4 differs from that of FIGURE 2 only in that it is displaced a quarter of a cycle.

If desired, a harmonic filter 90 can be placed at the output of the transformer to derive a sinusoidal AC output which can be maintained at constant amplitude, and/or an output derived from a secondary such as 14" can be monitored by suitable error detecting devices and fed back to control the system. The configuration at 14' illustrates that other than bridge rectifiers may be used to rectify the AC current output.

It will be appreciated that in both the embodiments of FIGURES 1 and 3 the operation is essentially the same, in that at predetermined time intervals, alternate circuit paths are established to permit the unregulated DC input voltage to flow in opposite directions through the primary of the transformer. This function is performed by transistors 26 and 28 in FIGURE 1, while in FIGURE 3 the function is performed by having the two transistors of each circuit path (66 and 68 or 78 and 80) simultaneously turned off and on at such predetermined time intervals. Similarly, in both embodiments, alternate discharge circuits are provided intermittently relative to the turning off and on of the aforementioned alternate circuit paths (by means of silicon controlled rectifiers 36 and 38 or equivalent elements in FIGURE 1, and by the use of only one of the transistors of each circuit path and a cooperating diode in FIGURE 3) to permit the input voltage in excess of the predetermined amount set by the voltage limiting means to be discharged across the primary of the transformer.

It is apparent that in either embodiment, the instant invention provides a power conversion system which is non-dissipative in nature, in that it does not require the utilization of a power consuming transistor in series with the input side of the primary, and secondly provides that the peak value of the output voltage waveform is regulated by voltage limiting means rather than directly dependent upon the peak output which may be presented to the transformer by the variable DC input.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A power converter for converting an unregulated DC input voltage to a regulated output voltage comprising:

transformer means having a primary portion and a secondary portion coupled thereto;

voltage limiting means cooperating with said transformer means for limiting the magnitude of input voltage which may appear across the primary portion of said transformer means to a predetermined amount;

energy storage means connected to said transformer means for accumulating input voltage which is in excess of said predetermined amount; and circuit discharge means activated at a time subsequent to the accumulation of input voltage by said energy storage means to permit said energy storage means to discharge the accumulated input voltage which is in excess of said predetermined amount across the primary portion of said transformer means;

whereby the output voltage appearing at said secondary portion of said transformer is a regulated waveform.

2. The power converter of claim 1, wherein said voltage limiting means includes a capacitor connected across the secondary portion of said transformer means.

3. The power converter of claim 1, wherein said energy storage means comprises an inductor connected to the primary portion of said transformer means.

4. The power converter of claim 1, wherein said circuit discharge means includes at least one normally non-conducting element which is changed to a conducting state at said time subsequent to the accumulation of said input voltage by said energy storage means to permit the discharge of said energy storage means across said primary portion.

5. The power converter of claim 4, wherein said normally non-conducting element is a silicon control rectifier.

6. The power converter of claim 4, wherein said normally non-conducting element is a transistor.

7. The power converter of claim 1, and further including normally non-conducting alternate circuit paths connected to said primary portion of said transformer means, said circuit paths being sequentially switched off and on at predetermined time intervals to cause current generated by said input voltage to alternately flow in opposite directions through said primary portion of said transformer means.

8. The power converter of claim 7, wherein said voltage limiting means includes rectifying means and a capacitor connected across the secondary portion of said transformer means.

9. The power converter of claim 7, wherein the time at which said circuit discharge means is activated occurs intermediate said predetermined time intervals at which said alternate circuit paths are sequentially switched off and on.

10. The power converter of claim 9, wherein said circuit discharge means includes normally non-conducting alternate return circuits which are alternately, sequentially activated at times intermediate said predetermined time intervals.

11. The power converter of claim 10, wherein said normally non-conducting alternate circuit paths each include at least one normally non-conducting element which is alternately switched off and on by the application of a driving signal thereto and each of said alternate return circuits includes at least one normally non-conducting element which is alternately switched on and off by the application of a driving signal thereto.

12. The power converter of claim 10, wherein said normally non-conducting alternate circuit paths each include two normally non-conducting elements which are simultaneously switched off and on at said predetermined time intervals by the application of a driving signal thereto, and said alternate return circuits each include one of said two normally non-conducting elements of one of said alternate circuit paths, in its conducting state, the other of said transistors of said one of said alternate circuit paths being switched off intermediate said predetermined time intervals.

13. A power converter for converting an unregulated DC input voltage to a regulated output voltage comprising:
a transformer having a primary and secondary inductively coupled thereto;
normally non-conducting alternate circuit paths connected to the primary of said transformer, said circuit paths being alternately switched off and on at predetermined time intervals to cause current generated by an unregulated DC input voltage to alternately flow in opposite directions through said primary;
voltage limiting means cooperating with said transformer for limiting the magnitude of input voltage which may appear across the primary of said transformer to a predetermined amount;
energy storage means connected to said primary for accumulating input voltage which is in excess of said predetermined amount; and
normally non-conducting alternate return circuits connected to said energy storage means and sequentially, alternately changed to a conducting state at times intermediate said predetermined time intervals to permit said energy storage means to discharge the accumulated input voltage which is in excess of said predetermined amount across the primary of said transformer;
whereby the output voltage appearing across said secondary is a regulated waveform.

14. The power converter of claim 13, wherein said alternate circuit paths each include a transistor which is changed to its conducting state by the application of a driving signal thereto, and said alternate return circuits each include a silicon controlled rectifier which is changed to its conducting state by the application of a driving signal thereto.

15. The power converter of claim 13, wherein said alternate circuit paths each include a transistor which is changed to its conducting state by the application of a driving signal thereto, and said alternate return circuits each include a transistor which is changed to its conducting state by the application of a driving signal thereto.

16. The power converter of claim 13, wherein said alternate circuit paths each include a pair of transistors which are simultaneously changed to their conducting states at said predetermined intervals by the application of driving signals thereto, and said alternate return circuits each comprise one of said transistors of one of said alternate circuit paths and a forward biased diode associated therewith.

References Cited

UNITED STATES PATENTS

| | | | |
|---|---|---|---|
| 3,242,415 | 3/1966 | King et al. | 321—45 |
| 3,319,147 | 5/1967 | Mapham | 321—18 XR |
| 3,331,008 | 7/1967 | Bedford | 321—45 XR |
| 3,353,085 | 11/1967 | Morgan | 321—43 |

JOHN F. COUCH, *Primary Examiner.*

WARREN E. RAY, *Examiner.*

W. M. SHOOP, *Assistant Examiner.*